United States Patent
Odegaard et al.

(10) Patent No.: US 7,440,919 B2
(45) Date of Patent: Oct. 21, 2008

(54) SYSTEM AND METHOD FOR A FINANCIAL PLANNING COMPETITION

(75) Inventors: Laura J Odegaard, St. Louis Park, MN (US); Ora Kaine, Corcoran, MN (US); Jana L Etheridge, Minneapolis, MN (US); Heather F Ford, Minneapolis, MN (US); Ruth Bowyer, Shoreview, MN (US); Terri L Anderson, Minneapolis, MN (US); Daniel J Candura, Braintree, MA (US)

(73) Assignee: Ameriprise Financial, Inc., Minneapolis, MN (US)

( * ) Notice: Subject to any disclaimer, the term of this patent is extended or adjusted under 35 U.S.C. 154(b) by 1712 days.

(21) Appl. No.: 09/974,613

(22) Filed: Oct. 10, 2001

(65) Prior Publication Data

US 2002/0091608 A1    Jul. 11, 2002

Related U.S. Application Data

(60) Provisional application No. 60/242,191, filed on Oct. 20, 2000.

(51) Int. Cl.
*G06Q 40/00* (2006.01)
(52) U.S. Cl. .......................................... 705/37; 705/38
(58) Field of Classification Search .............. 434/107, 434/110; 273/256; 705/38, 37, 36, 26
See application file for complete search history.

(56) References Cited

U.S. PATENT DOCUMENTS

| | | | |
|---|---|---|---|
| 4,767,335 A | 8/1988 | Curt | |
| 5,108,115 A | 4/1992 | Berman et al. | |
| 5,126,936 A | 6/1992 | Champion et al. | |
| 5,616,033 A | 4/1997 | Kerwin | |
| 5,727,950 A | 3/1998 | Cook et al. | |
| 5,884,285 A | 3/1999 | Atkins | |
| 6,021,397 A * | 2/2000 | Jones et al. | 705/36 R |
| 6,029,159 A | 2/2000 | Zorba et al. | |
| 6,062,862 A | 5/2000 | Koskinen | |
| 6,064,985 A | 5/2000 | Anderson | |
| 6,064,998 A | 5/2000 | Zabloudil et al. | |
| 6,106,300 A * | 8/2000 | Kiyosaki et al. | 434/107 |
| 2001/0042785 A1 * | 11/2001 | Walker et al. | 235/379 |
| 2004/0117302 A1 * | 6/2004 | Weichert et al. | 705/40 |

OTHER PUBLICATIONS

Community Trust Bankcorp, Inc, Operating Results Business Editors, Business Wire: Oct. 16, 2000. p. 1.*

* cited by examiner

*Primary Examiner*—Frantzy Poinvil
*Assistant Examiner*—Clement Graham
(74) *Attorney, Agent, or Firm*—Snell & Wilmer L.L.P.

(57) ABSTRACT

A method for a financial planning competition having at least two phases, an embodiment of the first phase including a written competition including providing a fictitious client profile to preselected teams, allowing each team thereafter to create a written financial plan based on the client profile and awarding a score. The second phase including giving high-scoring teams a revised client profile containing a change of facts to the original client profile allowing the teams to redraft the original financial plan, receiving an oral financial planning presentation from each team based upon the revised client profile for scoring and awarding a score. Any phase of the present invention may exist in a live environment or over a network, such as the Internet. The competition may also optionally include at least a third phase which is preferably styled, in one embodiment, as a game show format based on financial planning concepts.

35 Claims, 5 Drawing Sheets

SYSTEM AND METHOD FOR A FINANCIAL PLANNING COMPETITION

REFERENCE TO RELATED DOCUMENTS

This application claims priority to, and the benefit of, U.S. Provisional Patent Application Ser. No. 60/242,191, entitled SYSTEM AND METHOD FOR A FINANCIAL PLANNING COMPETITION filed on Oct. 20, 2000, the entire contents of which are hereby incorporated by reference.

FIELD OF INVENTION

The present invention relates to methods for financial planning, and more particularly, to a system and method for a financial planning competition having at least two phases.

BACKGROUND OF THE INVENTION

In general, comprehensive financial planning typically includes, for example, financial statement preparation and analysis (including cash flow analysis/planning and budgeting), investment planning (including portfolio design, i.e. asset allocation and portfolio management), income tax planning, education planning, risk management, retirement planning and estate planning. Many of the principles and rules of financial planning have been codified in industry standards, such as, for example, those standards set by the Certified Financial Planner Board Of Standards (found at www.cfp-board.org), which are incorporated herein by reference. For example, such standards describe the process a consumer should reasonably expect a certified financial planner practitioner to use in establishing and implementing a financial planning engagement.

Until recently, the principles of financial planning, personal finance, investing, accounting and the accumulation or loss of wealth were not sufficiently taught in the curricula of most educational institutions. Even today, only a select few schools teach these subject matter areas. Moreover, the few schools that may teach financial planning, typically concentrate the courses in the general finance subject area and often limit the teaching methods to traditional classroom instruction routines. In a few cases, some creative teaching methods exist in the basic principles of personal finance, such as, for example, U.S. Pat. No. 5,826,878 to Kiyosaki et al. and U.S. Pat. No. 6,106,300 to Kiyosaki et al., both of which are hereby incorporated by reference as background information.

Prior to the present invention, the financial planning field failed to provide a financial planning competition which allows team members to promote camaraderie and develop social skills, all while pursuing the same objective of providing quality financial planning advice. With the increase of financial planning and students interested in learning more about financial planning, a need exists for a fun, interesting and creative system and method for promoting financial planning and educating students about financial planning.

SUMMARY OF THE INVENTION

The present invention is a method and system for a financial planning competition which includes at least two phases. The first exemplary phase includes providing a fictitious client profile to a pre-selected team to create a written financial plan or similar advice based on the client profile. The written financial plan is judged based upon industry standards, such as, for example, those standards set by the Certified Financial Planner Board Of Standards. The teams having the highest cumulative score during the written competition are then asked to participate in a live competition during the second exemplary phase, however, for the second phase, each team is given a change (e.g., new facts or changed facts) to the original client profile. Thereafter, each team reworks their original financial plan and provides an oral presentation on the new financial plan to the judges for scoring. The competition may exist, for example, in a live environment or over a global computer network such as the Internet or other networks (e.g., WAN, LAN, etc). The competition may also optionally include at least a third phase which is preferably styled, in one embodiment, as a game show format whereby each team is tested on its knowledge of the financial planning industry and related topics.

The present invention allows each team to present its knowledge of financial planning techniques and services, while allowing each team to showcase its oral and problem solving skills. The present invention also allows the financial planning organization, such as, for example, American Express Financial Advisors, to recruit qualified financial planning students.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

DETAILED DESCRIPTION OF EXEMPLARY EMBODIMENTS

Systems and methods in accordance with various aspects of the present invention provide a financial planning competition having at least two phases of competition. As used herein, the terms "team", "team member", "financial planning organization", and "financial planning company" may be used interchangeably with each other, and each includes any person, entity, business, machine, hardware, and/or software which participates in or effectuates the steps of the present system for a financial planning competition. In an exemplary embodiment, the financial planning organization may be an organization in the financial services industry, a school, a vendor of the financial services industry, a sponsor of the event, a third party which performs any portion of the steps for the sponsoring organization, a group of financial organizations and/or the like.

The present invention is a financial planning competition having at least two phases. The competition is configured to test team knowledge of financial planning principles and to simultaneously promote the financial planning industry. As seen, for example, in FIG. 1, the present invention includes the steps of providing at least a case competition phase (generally represented by functional block 100) and a case presentation phase (generally represented by functional block 200). In an exemplary embodiment, the present invention may also include at least a third phase which is a financial planning knowledge competition (generally represented by functional block 300, the dotted-line illustration representing the optional feature of this phase).

Figure 2:
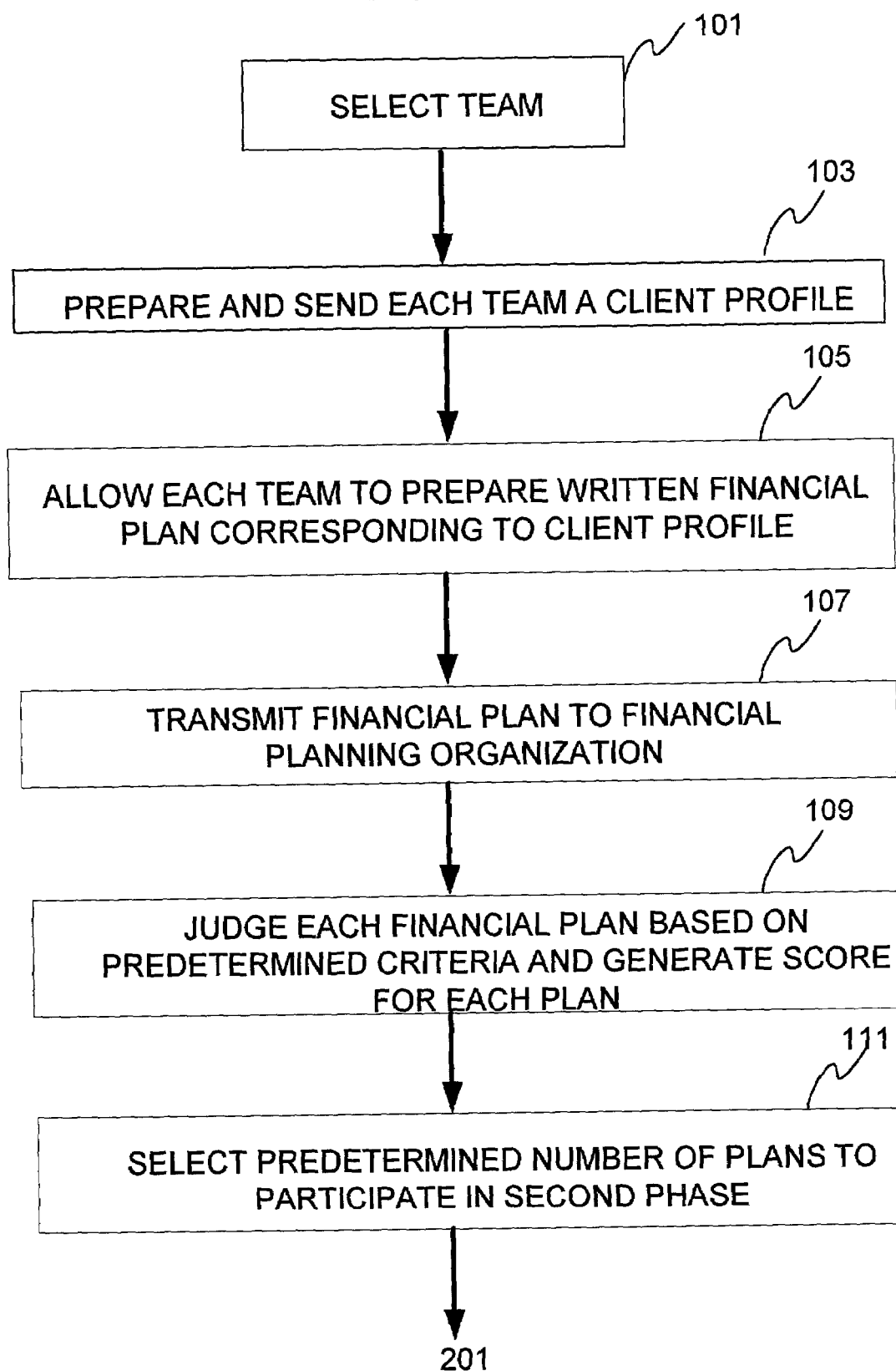
FIG. 2 is a block diagram of an exemplary first phase competition process of the present invention.

In one exemplary embodiment, and as seen in FIG. 2, a team is suitably selected during the first phase from each school as representatives of the school (step 101). Each team may come from a school which teaches and/or promotes financial planning case studies in the curriculum, however, other schools may also participate at the financial planning organization's discretion. To promote competition, the team members may be from the same institution; however, the invention contemplates teams of individuals, teams comprised of people from different schools, teams from regions, teams from classifications of schools and/or the like. Moreover, the competition may include only undergraduate students who have limited to no experience in the financial planning market, but in other embodiments, people from other educational levels may also participate. Thus, for example, a team may consist of three undergraduate students, each with less than one year's experience in the financial planning industry. An alternate team member may also be chosen. The team may be selected by any known method such as, for example, a lottery, people with the highest grades in financial planning courses, a local financial planning competition, or people may be chosen by faculty or a similar-level person affiliated with the financial planning organization.

Figure 5:
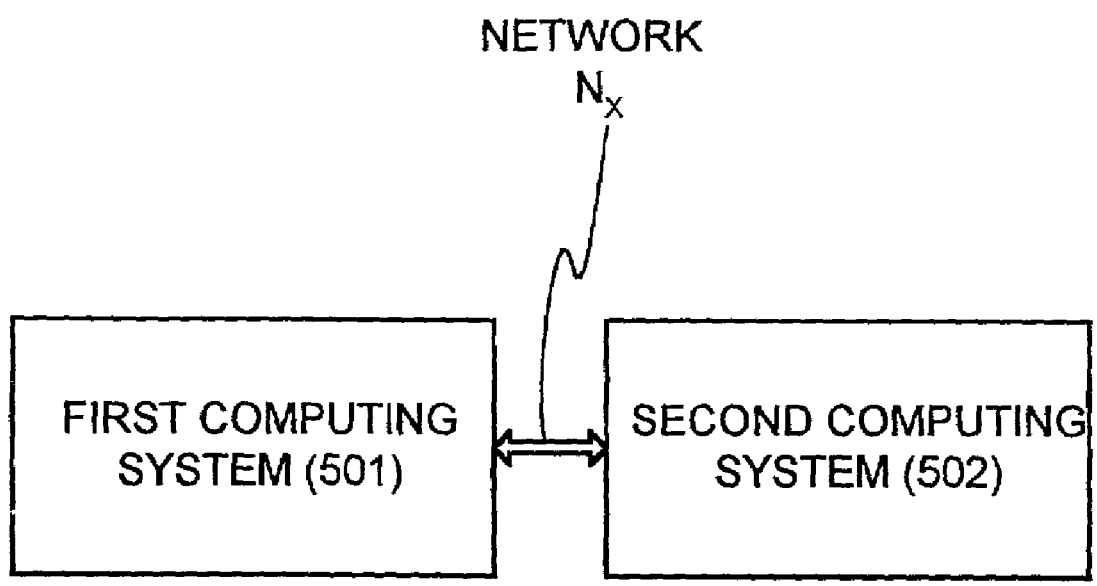
FIG. 5 is a representative block diagram of a computing system as configured for one embodiment of the present invention.

The financial planning organization prepares and sends to each participating team a fictitious client profile datasheet (step 103). For example, the fictitious client profile data may include financial information corresponding to a forty year old couple who has one child, average income earnings and desires to accumulate assets towards at least one financial goal. A representative, exemplary fictitious client profile is disclosed in FIG. 5. One skilled in the art will appreciate that real or factual client profile data may be used in the client profile datasheet, or any combination of real, redacted or fictitious data may be used. Thus, for example, the team will receive names of the fictitious clients (e.g., two names of clients if a married couple, or a single name if a single person), their dates of birth, social security numbers, state of residence, citizenship and health status. The client profile will further typically include: dependent children information, employment information, relationship information, background information, financial goal information, asset information (e.g., personal assets, cash assets, fixed/equity assets, retirement assets, estimated known liabilities, life insurance policies, income information, tax information, retirement plan information, savings information, and discretionary and committed expense information). In an exemplary embodiment, the present invention requires each written financial plan to be judged on the following major concepts: calculations relating to the plan; appearance of the plan; financial planning concepts; and quality of advice/strategies and recommendations. Thus, for example, each plan includes a detailed outline of the calculations relating to the plan, including the fictitious client's net worth, gross estate, total qualified assets at retirement, capital surplus/shortage of the assets when a dependent is in college, cash flow surplus/shortage and liquidity surplus/shortage in the event of death.

For example, an exemplary client profile data will include the names of the client, demographic information, dependents/children information, employment information and educational information. Thus, for example, a representative exemplary client profile may be described as: "Tony and Marie met as undergrads at the State University. In 1983 after graduating, they got married and began working on their careers. In 1987 they had their daughter, Michaela. Michaela is their only child and is currently in the 8th grade. Marie comes from a very large family. She has 6 brothers and sisters. Her mother Rosa passed away in early 1998. Because Marie has several siblings, her inheritance was limited to a relatively small amount of cash and a few antiques including a strand of pearls, a diamond ring, and her Grandmother's Oriental rug. Tony comes from a smaller family who is all healthy and living in Illinois. Michaela is actively involved in figure skating as well as taking violin lessons (an instrument that she loved hearing her great grandfather play). Besides her extra-curricular activities, Michaela is also very intelligent. Because of the exceptional advanced placement classes available at the local public high school, Tony and Marie have agreed it would be better for Michaela to attend school there as opposed to the private high school they were considering. So, next year, Michaela will enter the 9th grade at the public high school. One reason that Tony and Marie are looking for financial guidance is that Michaela has started talking about attending school out of state. Tony and Marie have been saving money for Michaela's college, but they assumed she would want to attend the State University like they did. Because of her potential, they would like to be able to provide for the entire cost of an out of state private university for four years if that is what Michaela decides to do. They estimate that to be approximately $10,000 per semester including room and board. Marie has really enjoyed establishing her career as a graphic designer. She started with Lake Design as an intern during college and accepted a position with them after she graduated. She has a great reputation throughout the company and manages several different projects. Before she passed away, Rosa watched Michaela before and after school. Because family is so important to them, Marie has been able to adjust her work schedule so that she is able to pick Michaela up after school. The firm that Tony works for is extremely large. He has been doing well as a Sales Manager and really likes ABC. He has managed to hit his bonuses for the last several years and expects to do so this year as well. His bonus, 50% of his salary paid out semi-annually, makes up a large piece of his income. Tony plans on staying with ABC even though he has moved to a few different firms over the past 15 years. Tony and Marie bought their 3 bedroom 2-bath home in 1995 for $130,000. Their neighborhood has grown considerably and their home is now valued at $215,000. They had a down payment of $26,000 on a 30-year mortgage at 825%. In October 1998 they remodeled their kitchen using $15,000 of their $30,000 home Equity Line of Credit at Prime. Besides wanting to provide for Michaela's college costs, Tony and Marie want to retire when they are 55. They both watched their parents work until they were too old to enjoy retirement and they do not want that to happen. Tony loves gardening, woodworking and fishing and plans on building a workshop in the backyard when he retires. Marie loves to sculpt and paint, but does not get to spend as much time on it as she would like. Her plan in retirement is to fill their entire house with her art. And once the house is full, she is going to begin on Tony's workshop! They do not have a big desire to travel often, but do plan on taking an occasional trip, especially to go and see Michaela if she is not living in Minnesota. They feel that even with the occasional trips, they would only need 80% of their current expenses during their retirement. They believe they will receive Social Security benefits and since they will have retired before eligibility, they want to take their benefits at the earliest opportunity. Tony and Marie have wills that they created in 1995 with a Home Will software program because they were going on a Caribbean vacation. They haven't looked at them since. In those wills, Rosa was named Guardian of Michaela in the event something happened to both of them and all of their property went to the other spouse. Tony and Marie want to make sure that they don't pay unnecessary estate taxes and Marie saw how complicated and time consuming her mother's estate was to probate and they don't want Michaela faced with that. Another concern that Tony and Marie have is the event of their death or disability. They have disability and life policies through work as well as two independent 10-year term policies on each of them, but they are not sure what they currently have is enough. They feel that if one of them were to become disabled the family could live on 80% of their current expenses and if one of them passed away the family could live on 70% of their current expenses. Even though 55 is an early retirement age, they still want to plan on retiring at 55 in the event one of them were disabled or had passed away. Tony and Marie feels they are moderately conservative right now with their portfolio, but they are interested in ideas that could improve their current returns without taking excessive risk. Marie drives a Ford Explorer and is tired of it! They bought it in January 1997 for $26,000 and traded-in her old Toyota valued at $4,000. They financed the Explorer for 5 years at 5%. She has enjoyed driving Tony's Passat that he recently leased and would not be opposed to a new vehicle now that Michaela is older. Tony leased the Passat in July 1999 for 36 months. The list value on the Passat is $28,500 with a residual value of $16,000. Tony drives the car back and forth to work and usually on the weekends when the family goes out. The current miles are 10,200 with a 12,000 per year mileage agreement. Each additional mile is 15 cents per mile. Tony doesn't think he will have to use the extra mileage option. In the event of Marie's death, Tony would keep the lease on his Passat, pay off the loan on the Explorer and sell it."

For the fictitious client profile previously described, the following assumptions may also be made and provided to each team:

| Rates of return: | | |
|---|---|---|
| | Before-Tax | After-Tax |
| Conservative | 5.0% | 4.0% |
| Moderately Conservative | 6.9% | 5.5% |
| Moderately Aggressive | 8.8% | 7.0% |
| Aggressive | 10.6% | 8.5% |

Tuition costs are increasing at 7% per year.
The global inflation rate is 3%.
The prime interest rate is 8.5%.
The Primary Insurance Amount (PTA) is $2,148 for Tony and $2,322 for Marie.
All liability payments are due at the end of the period.

| Personal Assets: | | |
|---|---|---|
| Description | Owner | Current Value |
| Home | Joint | $215,00 |
| Furnishings | Joint | $25,000 |
| Diamond Ring | Marie | $8,000 |
| Grandmother's pearls | Marie | $1,500 |
| Oriental Rug | Marie | $10,000 |
| Antique Violin | Tony | $6,000 |

-continued

| Personal Assets: | | |
|---|---|---|
| Description | Owner | Current Value |
| 16 Ft. Power Boat | Tony | $3,000 |
| 1997 Ford Explorer | Joint | $18,500 |

| Cash Assets: | | |
|---|---|---|
| Description | Owner | Current Value |
| Savings - Farmington Corp | Joint | $12,400 |
| Checking - Farmington Corp | Tony | $1,000 |
| Checking - Credit Union | Marie | $14500 |
| Money Market Account | Joint | $5,860 |

| Fixed/Equity Assets: | | |
|---|---|---|
| Description | Owner | Current Value/Purpose |
| EE Bonds | Marie | $5,350 for Education |
| Odegaard Balanced Fund | UTMA for Michaela | $1,550 for Education |
| 100 shares of XYZ | Tony | $2,800 |
| 100 shares of ZYX | Tony | $3,100 |

| Retirement Assets: | | |
|---|---|---|
| Description | Owner | Current Value/Purpose |
| Odegaard Government Securities Fund | Marie's IRA | $24,600 for retirement |
| Odegaard Emerging Markets Fund | Tony's IRA | $29,875 for retirement |
| 401(K) S&P 500 Index Fund | Tony | $21,985 for retirement |
| 401(K) Guaranteed Investment Trust | Marie | $42,185 for retirement |
| 401(K) ABC Manufacturing (Common) | Tony | $18,000 for retirement |

| | | Liabilities | | | |
|---|---|---|---|---|---|
| Description | Liability 1 Mortgage | Liability 2 Home Equity Line | Liability 3 Car Loan | Liability 4 Credit Card | Liability 5 Credit Card |
| Debtor/Leasor | Farmington Co-operative (Joint) | MN Bank (Joint) | Ford Credit (Joint) | Big Bank (Joint) | Small Bank (Joint) |
| Interest Rate | 8.25% | 8.5% (Prime) | 5% | 16.5% | 13.5% |
| Payment (principal + interest) | $781 | $186 | $415 | $250 | $175 |
| Payment frequency | Monthly | Monthly | Monthly | Monthly | Monthly |
| Original Balance | $104,000 | $15,000 | $22,000 | $4,500 (current bal.) | $2,000 (current bal.) |

-continued

Liabilities

|  | Liability 1 | Liability 2 | Liability 3 | Liability 4 | Liability 5 |
|---|---|---|---|---|---|
| Description | Mortgage | Home Equity Line | Car Loan | Credit Card | Credit Card |
| Origination Date | September 1995 | October 1998 | January 1997 | N/A | N/A |
| Original Term in months | 360 | 120 | 60 | N/A | N/A |

Life Insurance Policies:

|  | Policy 1 | Policy 2 | Policy 3 | Policy 4 |
|---|---|---|---|---|
| Type | Ten-year term | Ten-year term | Group Term | Group Term |
| Insurance Co. | Big Insurance | Big Insurance | Huge Insurance | Major Insurance |
| Death Benefit | $100,000 | $100,000 | 2× salary | 2× salary |
| Person Injured | Tony | Marie | Tony | Marie |
| Owner | Tony | Marie | Tony | Marie |
| Beneficiary | Marie | Tony | Marie | Tony |
| Cash Value | $0 | $0 | $0 | $0 |
| Premium Amount | $255 | $210 | Company paid | Company paid |
| Payment frequency | Annually | Annually | N/A | N/A |

Income:

|  | Amount | Frequency | Client |
|---|---|---|---|
| Salary (Gross) | $3,000 | Monthly | Tony |
| Salary | $2,308 | Bi-weekly | Marie |
| Bonus | $9,000 | Semi-annually | Tony |

Income Taxes:

|  | Amount | Frequency |
|---|---|---|
| Tony: | | |
| Federal Income tax withholding and/or estimated payments | $407 (from salary) $1,260 (from bonus) | Monthly Semi-annually |
| State and Local income tax withholding and/or estimated payments | $156 (from salary) $484 (from bonus) | Monthly Semi-annually |
| FICA (Social Security) tax withholding | $230 (from salary) $689 (from bonus) | Monthly Semi-annually |
| Marie: | | |
| Federal Income tax withholding and/or estimated payments | $315 | Bi-weekly |
| State and Local Income tax withholding and/or estimated payments | $121 | Bi-weekly |
| FICA (Social Security) tax withholding | $177 | Bi-weekly |

Retirement Plan Contributions:

|  | Contribution Amount | Frequency | Employer Contribution |
|---|---|---|---|
| Tony | | | |
| S&P 500 Index | 2.5% of base salary | Monthly | 0% |
| ABC Company Stock | 2.5% of base salary | Monthly | 1.5% (50 cents on the first 3%) |
| Marie | | | |
| Guaranteed Investment Trust | 10% of salary | Bi-weekly | 3% (50 cents on the first 6%) |

Systematic Savings Contributions (non-qualified):

|  | Amount | Frequency |
|---|---|---|
| Odegaard Balanced Fund (for Education goal) | $100 | monthly |

Discretionary Expenses:

|  | Amount | Frequency |
|---|---|---|
| Cable TV | $50 | Monthly |
| Dining | $250 | Monthly |
| Dues | N/A | |
| Entertainment | $150 | Monthly |
| Gifts to charities | $2000 | Yearly |
| Gifts to family and others | $500 | Quarterly |
| Hobbies | $100 | Monthly |
| Recreation | N/A | |
| Subscriptions | $25 | Monthly |
| Travel (vacation) | $2,500 | Annually |
| Pet Care Expenses | $125 | Quarterly |

Committed Expenses:

|  | Amount | Frequency |
|---|---|---|
| Housing: | | |
| Rent | N/A | |
| Home/rent insurance | $275 | Annually |
| Real estate taxes | $1,350 | Semi-annually |
| Utilities (electric, fuel, water, sewer) | $185 | Monthly |
| Food, clothing, transportation | | |
| Food/groceries | $125 | Monthly |
| Clothing | $750 | Quarterly |
| Auto insurance premiums | $1,250 | Semi-annually |
| Auto maintenance (oil, fuel) | $60 | Monthly |
| Vehicle Tax | $625 | Annually |
| Other (tolls, bus, auto lease) | | |
| Auto Lease | $375 | Monthly |
| Loan Payments: | | |
| Mortgage | $776 | Monthly |
| Auto | $415 | Monthly |

-continued

Committed Expenses:

|  | Amount | Frequency |
|---|---|---|
| Other |  |  |
| Home Equity Line | $200 | Monthly |
| Other Committed Expenses: |  |  |
| Alimony | N/A |  |
| Bank charges | N/A |  |
| Charge account/credit card payments | $425 | Monthly |
| Child support | N/A |  |
| Dependent care | N/A |  |
| Education costs (violin lessons) | $50 | Monthly |
| Home improvements/repairs | $100 | Monthly |
| Medical costs (co-pay) | $10 | Monthly |
| Prescription drugs | $10 | Monthly |
| Personal Care (hair care/dry cleaning, etc.) | $50 | Monthly |
| Premiums (medical insurance) | $120 | Monthly |
| Premiums (umbrella insurance) | N/A |  |
| Premiums (other) | $25 | Monthly |
| Telephone (local, long distance, cellular) | $75 | Monthly |
| Unreimbursed employee expenses | N/A |  |
| Other: |  |  |
| Figure skating-Michaela | $150 | Monthly |
| Health Club-family | $117 | Monthly |
| Ice skates | $500 | Annually |

Each team then prepares a portion of, or a complete, professional financial plan corresponding to the client profile data (such as the exemplary version described above), integrating and using the financial planning subject areas as defined by the CFP Board of Standards (step 105). In an exemplary embodiment, the financial plan is written; however, in other embodiments, the financial plan may be created electronically, within a web page and/or in conjunction with other presentation materials, graphics, video, audio and/or the like. The written financial plan, for example, may include spreadsheets or other financial documents corresponding to the most advantageous financial plan available for the fictitious client. In an exemplary embodiment, only team members may work on creating, developing and finalizing the written financial plan (e.g., the team members should not rely on other non-team students, graduate students, faculty advisors and/or industry knowledgeable persons to assist in the creation of the written financial plan). Each team may use commercially available spreadsheet, word processing and presentation software applications (including calculators) and including a world wide global computer network such as the Internet to prepare the written financial plan, but in one embodiment, should not use any available financial planning software or like applications. The plans prepared by each team are thereafter transmitted to the sponsoring financial planning organization by mail or other conventional or known means (such as, for example, by encrypted electronic mail or by facsimile transmission) (step 107). The primary goal for the written first phase 100 is for each team to provide a comprehensive financial plan integrating the financial planning subject area.

The cases are then reviewed or otherwise judged by any suitable person, group, system, software, hardware or method suitably configured to analyze the cases and/or data. In one embodiment, the cases are compared to standards or rules. In an exemplary embodiment, the cases are reviewed and judged by industry professional reviewers based upon predetermined financial planning criteria and awarded or otherwise assigned a score (step 109). The reviewers or judges are preferably selected from those persons who are knowledgeable in the financial planning environment, experienced financial planners, consultants or like financial planning specialists. Each case presented by the team will be judged based on predetermined criteria for financial planning concepts and high-quality advice criteria and assigned a score to each plan. The financial plan will be judged for creativity in several areas such as, for example, providing a plan which assists a client to reach a financial goal while achieving a tax benefit at the same time, along with the appearance of the financial plan. For example, the judging for each financial planning case reviewed can be based on a representative method of judging as described further below. In an exemplary embodiment, the judging will be based on the written financial plan's table of contents, personal data/information page, goal summary, analysis of the personal financial planning subject area, recommendations and appendix or supporting materials. As defined by the CFP Board of Standards, "personal financial planning subject areas" denotes the basic subject fields covered in the financial planning process which typically include, but are not limited to, financial statement preparation and analysis (including cash flow analysis/planning and budgeting), investment planning (including portfolio design, asset allocation and portfolio management), income tax planning, education planning, risk management, retirement planning and estate planning."

The financial plan should also provide the fictitious client with, for example, actionable steps to take with regard to his or her financial goals, the timing of implementing the financial plan, why the plan should be followed, how the plan should be followed, what assets are involved, identify any parties to implement the plan, discuss the advantages and disadvantages of the plan compared to other financial plans and/or provide any significant alternatives if such alternatives exist. Thus, teams will be judged, in an exemplary embodiment of the present invention, on various areas of financial planning methodologies to determine whether the team showed awareness and use of industry standards, whether the team used correct mathematical formulations and compilations, whether correct tax law information and tables were used, whether regulatory guidelines were followed and whether the advice provided was specific, thorough, objective and clear.

An advisor at each representative location may suitably provide minimal assistance to the team as it is preparing its written financial plan or preparing for any oral presentations. As stated previously, an advisor may suitably be any faculty member or a similar-level person affiliated with the financial planning organization. In this embodiment, the advisor will share information with the financial planning organization and other interested third parties (such as other school officials, for example), generate interest in the present invention at the school, develop and manage a process for selecting each team member and alternate team member(s) and/or accompany the team to all competitions (whether live or by other interactive means such as through a computing network) to assist each team member in understanding the competition and assess each team member's evaluation following each competition.

A predetermined number of financial plans obtaining the highest scores during the first phase will be chosen by the financial planning organization (step 111), such as for example American Express Financial Advisors, to participate in the second phase, which is in one embodiment a live competition event 200. Thus, for example, the top six cases may be chosen by the financial planning organization for participation in the live competition event. In an exemplary embodiment, the score for the written phase of the competition 100 will not carry over to the other phases of the competition (e.g., 200, 300). Thus, once a team is determined to be within the top written case planning groups, that team's score will return to zero for future competitive events. Alternatively, any use or partial use of the first phase score may be contemplated by the present invention for use in the second or subsequent phases. Those of skill in the art will realize that other scoring methods may be used to determine a team's participation during the second or subsequent phases of the present invention.

Figure 3:
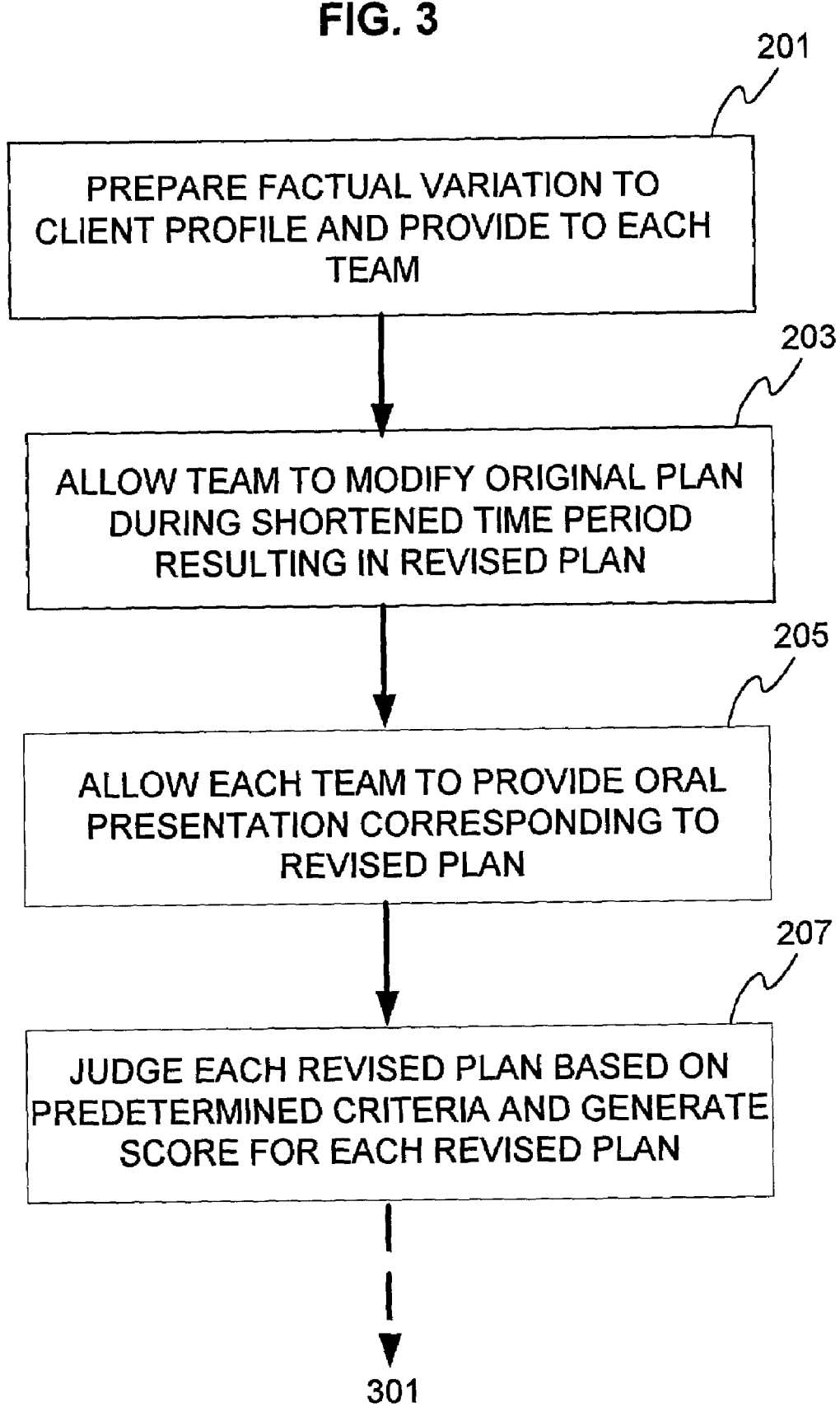
FIG. 3 is a block diagram of an exemplary second phase competition process of the present invention.

During the second phase 200, as illustrated by the exemplary functional blocks in FIG. 3, the financial planning organization prepares a factual variation to the original client profile and provides the revised client profile to each of the selected teams (step 201). Each team then modifies their respective financial planning strategies and recommendations based on the new information provided (step 203), and subsequently provides a new client profile or an oral presentation based on the new client profile (step 205). Further, during the second phase, each team is given a shortened amount of time in which to modify the team's original financial plan in view of the new or otherwise revised client profile. The teams thereafter provide the revised client profile or an oral presentation of the revised client profile to the judges wherein they present the recommendations and strategies incorporating the new variations into the financial plan and provide recommendations and strategies based on the new client profile. Similar to the judging process performed in the first phase, each case presented by the team during the second phase is suitably judged based on predetermined criteria for financial planning concepts and high-quality advice criteria and assigned a score to each plan (step 207). Similarly, each case may be based on the same or like type of judging method used in the first phase as described above (e.g., step 109 in FIG. 2).

Thus, for example, a representative exemplary revised client profile may be described as: "As you were putting the finishing touches on the Hernandez financial plan for their appointment at the end of this week, you get a call from Marie. It seems that Tony's Uncle Bill passed away Sep. 15, 1999 and Tony was named in his will. Tony and Marie knew that Tony was named in the will but they didn't know the items would be so valuable. Uncle Bill had two children, Kathleen and Roger, but considered Tony to be like a son, too. Since he had two children, Tony didn't expect to inherit that much. Uncle Bill lived in Florida and was a widower. The son and daughter are each inheriting $225,000. The following are the items that Tony is inheriting: The first item is a travel trailer that Uncle Bill used every summer. It is a 1993 26-foot travel trailer and is in very good shape. Even though they went camping with Uncle Bill from time to time, they don't think they would use it on a regular basis and would like to go ahead and sell it. The title on the trailer has been changed to Tony Hernandez. Kathleen, the executor of the estate, had the trailer appraised for estate purposes. The appraisal valued the trailer at $26,000. Roger said other comparable trailers are selling at around the appraisal value and he thinks Tony would have no problem selling it for that. Roger thinks they should be able to sell it within a month since the weather is starting to warm up. The second item is a DEF stock certificate. Uncle Bill had owned this stock for quite some time. He was always proud of that stock and Tony was the only one that would listen to him brag! The certificate is for 100 shares and the original purchase price was $1,000 ($10 per share). Based on copious records that Uncle Bill kept, the stock split twice—once in November 1992 and once in February 1997 (both were 2 for 1 stock splits). The date of death price per share was $125 and the price per share six months after date of death was $102.50. As of today, the price per share is $105. All paperwork has been submitted to the transfer agent to issue the certificate in Tony's name. Finally, Tony inherited a $20,000 LIL Debenture Bond. It is a 9% bond, issued in November 1992 and due November 2022. It is callable November 2002@ 104.190. The estimated yield is 8.6% and the current price is 104.5. The paperwork to reregister the bond in Tony's name has also been submitted. Tony and Marie would like you to consider these additional assets as you provide them with recommendations to reach their retirement goal and education goal. They would like to set aside a lump sum that will completely fund Michaela's education goal without any additional monthly savings. They know that this would make Uncle Bill happy. He always thought Michaela was so bright and talented! Then they would like to see how the remaining balance of the inheritance impacts their retirement goal."

Because of the change to the facts in the original client profile, and due to the shortened amount of time to modify the original plan, those of skill in the art will appreciate that this phase of the financial planning competition emphasizes quick thinking and professionalism as might be expected in a real-life financial planning situation. Moreover, those of skill in the art will realize that the second phase may be alternatively accomplished by use of various computing systems coupled to known network or like data transmission means. Thus, for example, this phase does not require in-person participation, but rather, this phase (like other phases) could be accomplished by allowing each team to interactively participate in the second and subsequent phases of the competition by use of a personal computer coupled to the financial planning organization's computing system over a network such as the Internet.

The second phase of the competition may complete the overall competition or may be only an additional portion of the competition. If the second phase of the competition completes the competition, the financial organization judges the oral presentation and provides graded scores. The team with the highest score or scores wins the competition (step 207), receives an award or receives extra predetermined privileges.

If this phase of the competition does not complete the competition, the financial organization may include other phases of the competition to further test each team's ability to provide sound and quality financial planning advice (e.g., phase 300). Thus, for example, at least a third phase of the competition may be used to determine the overall winning team. For example, an optional third phase may include having each team participate in a gameshow-style competition that tests student knowledge of basic financial planning terms and concepts for points (as seen, for example, by the representative method or process illustrated in FIG. 4 and further described herein). The combined score from the second and at least third phase may, in one embodiment, be added or otherwise combined to determine the team with the highest score, and thus, the overall winning score.

In order to participate in this competition, unconventional rules may be used to enhance each team member's excitement and experience levels, while simultaneously promoting a financial planning career by providing an opportunity to learn more about the financial planning process. As such, in one exemplary embodiment of the present invention, special rules may be used in accordance with each phase of the competition as described further below.

As discussed above, in one embodiment, each case is evaluated during a judging process. In the judging process, which may be used for example during the first and/or the second phases, each financial planning case is reviewed and scored by at least three reviewers based on model answers generated from a commercial financial planning software such as FASware produced by American Express Financial Advisors. Further details related to financial planning systems and software is found in U.S. Pat. No. 5,819,263 entitled FINANCIAL PLANNING SYSTEM INCORPORATING RELATIONSHIP AND GROUP MANAGEMENT and U.S. patent application Ser. No. 09/141,013 entitled COMPUTER IMPLEMENTED PROGRAM FOR PLANNING AND ADVICE SYSTEM filed on Aug. 26, 1998, both of which are hereby incorporated by reference as background information.

As to most subject areas, scores will be provided based on ranges of acceptable answers. Exemplary computations, answer ranges and possible points are shown in Tables 1a-1e for the plan calculations (with additional points awarded if calculation detail is provided by the team), Tables 2a -2c for the appearance of the plan, Tables 3a -3 f for the financial planning concepts and Table 4 for the plan's quality of advice and strategy recommendations:

TABLE 1a

| | Points awarded by comparison of team answer with target range answer | | | |
|---|---|---|---|---|
| | 4 Points | 3 Points | 2 Points | 1 Point |
| Calculated Net Worth = $326,1230 | $309,814 to $342,426 | $293,508 to $358,732 | $277,202 to $375,038 | $260,896 to $391,344 |
| Gross Estate = $396,140 | $376,333 to $415,947 | $356,526 to $435,754 | $336,719 to $455,561 | $316,912 to $475,368 |

TABLE 1b

| | 4 Points | 3 Points | 2 Points | 1 Point |
|---|---|---|---|---|
| Calculated Total Educational Costs in Future Dollars = $116,397 | $110,577 to $122,217 | $104,757 to $128,037 | $98,937 to $133,857 | $93,118 to $139,676 |

TABLE 1c

| | 4 Points | 3 Points | 2 Points | 1 Point |
|---|---|---|---|---|
| Calculated Liquidity Surplus or Shortage = $129,741 | $123,254 to $136,228 | $116,767 to $142,715 | $110,280 to $149,202 | $103,793 to $155,689 |

TABLE 1d

| | 4 Points | 3 Points | 2 Points | 1 Point |
|---|---|---|---|---|
| Calculated Cash Flow Surplus or Shortage $899/mo or $10,787/yr | $854/mo. to $944/mo OR $10,248/yr to $11,326/yr | $809/mo. to $988/mo OR $9,708/yr to $11,866/yr | $764/mo. to $1,034/mo OR $9,169/yr to $12,405/yr | $719/mo. to $1.078/mo OR $8,630/yr to $12,944/yr |

TABLE 1e

| | 4 Points | 3 Points | 2 Points | 1 Point |
|---|---|---|---|---|
| Calculated Total Qualified Assets at Retirement = | | | | |
| Conservative = $567,053 | $538,700 to $595,406 | $510,348 to $623,758 | $481,995 to $652,111 | $453,642 to $680,464 |
| Moderately Conservative $708,915 | $673,469 to $744,361 | $638,024 to $779,807 | $602,578 to $815,252 | $567,132 to $850,698 |
| Moderately Aggressive = $892,243 | $847,631 to $936,855 | $803,019 to $981,467 | $758,407 to $1,026,079 | $713,794 to $1,070,692 |
| Aggressive = $1,115,609 | $1,059,829 to $1,171,389 | $1,004,048 to $1,227,170 | $948,268 to $1,282,950 | $892,487 to $1,338,731 |

TABLE 2a

| Appearance of Format | 5 Points | 4 Points | 3 Points | 2 Points | 1 Point |
|---|---|---|---|---|---|
| | Professional/ Superb | | | | Unprofessional |

TABLE 2b

| Grammar and Spelling | 5 Points | 4 Points | 3 Points | 2 Points | 1 Point |
|---|---|---|---|---|---|
| | Error Free | | | | Numerous Errors |

TABLE 2c

| Creativity | 10 Points | 8 Points | 6 Points | 4 Points | 2 Points |
|---|---|---|---|---|---|
| | Innovation and Unique | | | | Ordinary |

TABLE 3a

| Risk Management | 4 Points | 3 Points | 2 Points | 1 Point | 0 Points |
|---|---|---|---|---|---|
| | Outstanding Coverage | Commendable Coverage | Basic Coverage | Limited Coverage | Not Covered At All |

TABLE 3b

| Investment Management | 4 Points | 3 Points | 2 Points | 1 Point | 0 Points |
|---|---|---|---|---|---|
| | Outstanding Coverage | Commendable Coverage | Basic Coverage | Limited Coverage | Not Covered At All |

TABLE 3c

| Income Tax Management | 4 Points | 3 Points | 2 Points | 1 Point | 0 Points |
|---|---|---|---|---|---|
| | Outstanding Coverage | Commendable Coverage | Basic Coverage | Limited Coverage | Not Covered At All |

TABLE 3d

| Retirement Planning | 4 Points | 3 Points | 2 Points | 1 Point | 0 Points |
|---|---|---|---|---|---|
| | Outstanding Coverage | Commendable Coverage | Basic Coverage | Limited Coverage | Not Covered At All |

TABLE 3e

| Education Planning | 4 Points | 3 Points | 2 Points | 1 Point | 0 Points |
|---|---|---|---|---|---|
| | Outstanding Coverage | Commendable Coverage | Basic Coverage | Limited Coverage | Not Covered At All |

TABLE 3f

| Estate Planning | 4 Points | 3 Points | 2 Points | 1 Point | 0 Points |
|---|---|---|---|---|---|
| | Outstanding | Commendable Coverage | Basic Coverage | Limited Coverage | Not Covered At All |

TABLE 4

Quality of Advice/Strategies and Recommendations
Award at least one point for each affirmative (yes) answer CLARITY
Did the plan:

| | | |
|---|---|---|
| Use words that are commonly understood? | Yes | No |
| Provide recommendations free of jargon and acronyms? | Yes | No |
| Clearly define and explain any technical concepts or terms? | Yes | No |
| Directly link the advice to the clients' priorities and objectives? | Yes | No |
| Date all advice provide to the client? | Yes | No |

OBJECTIVITY
Did the plan:

| | | |
|---|---|---|
| Consider the clients' needs first? | Yes | No |

TABLE 4-continued

Quality of Advice/Strategies and Recommendations
Award at least one point for each affirmative (yes) answer

| | | |
|---|---|---|
| Make sure the recommendations are appropriate for the clients? | Yes | No |
| Do financial planning without practicing law or providing specific accounting advice? | Yes | No |
| Refer the clients to other professional as appropriate? | Yes | No |
| Provide the clients with appropriate alternative courses of action to achieve goals? | Yes | No |

THOROUGHNESS
Did the plan:

| | | |
|---|---|---|
| Identify sources of information and assumptions? | Yes | No |
| Include rationales for recommendations made? | Yes | No |
| Show how one action the clients may take affects other parts of their situation? | Yes | No |
| Discuss both the pros and cons of the recommendations? | Yes | No |
| Identify any factors and/or client needs that aren't addressed and why? | Yes | No |

SPECIFICITY
Did the plan:

| | | |
|---|---|---|
| Refer the clients' specific circumstances, specific needs and goals? | Yes | No |
| Base the advise provided on the current situation for the client? | Yes | No |
| Spell out the actions recommended? | Yes | No |
| Quantify the advice (by dollar amount, time periods, etc)? | Yes | No |
| Make sure the advice is detailed so the client and/or other professional can take action? | Yes | No |

Total points:

Thus, those of skill in the art will appreciate that the present invention requires each team to present a convincing strategy to the judges (both at the written first phase, the oral second phase of the competition and/or other phases) for how representative clients may obtain their financial goal or goals. Each team is graded in clarity, conciseness, thoroughness, ease of understanding the plan, creativity, correct calculations and like objective and subjective areas. In this embodiment, the total score is calculated from the scores awarded pursuant to the foregoing tables. The team achieving the most points is declared the winner and awarded a corresponding prize, such as special privileges in future games, cash or scholarship(s). Teams with lower scores may be eligible as runner-up teams with corresponding awards. Preferably, each team will receive dynamic feedback from the judges on the oral and written presentations made. In the event that a tie exists in the scoring between competing plans, the highest score awarded in the following order will, in one exemplary embodiment, decide the winning or higher scoring plan: 1) calculation score; 2) financial planning concepts score; 3) strategies/recommendations score; 4) appearance/creativity score; or 5) group discussion of judges resulting in final decision.

Figure 1:
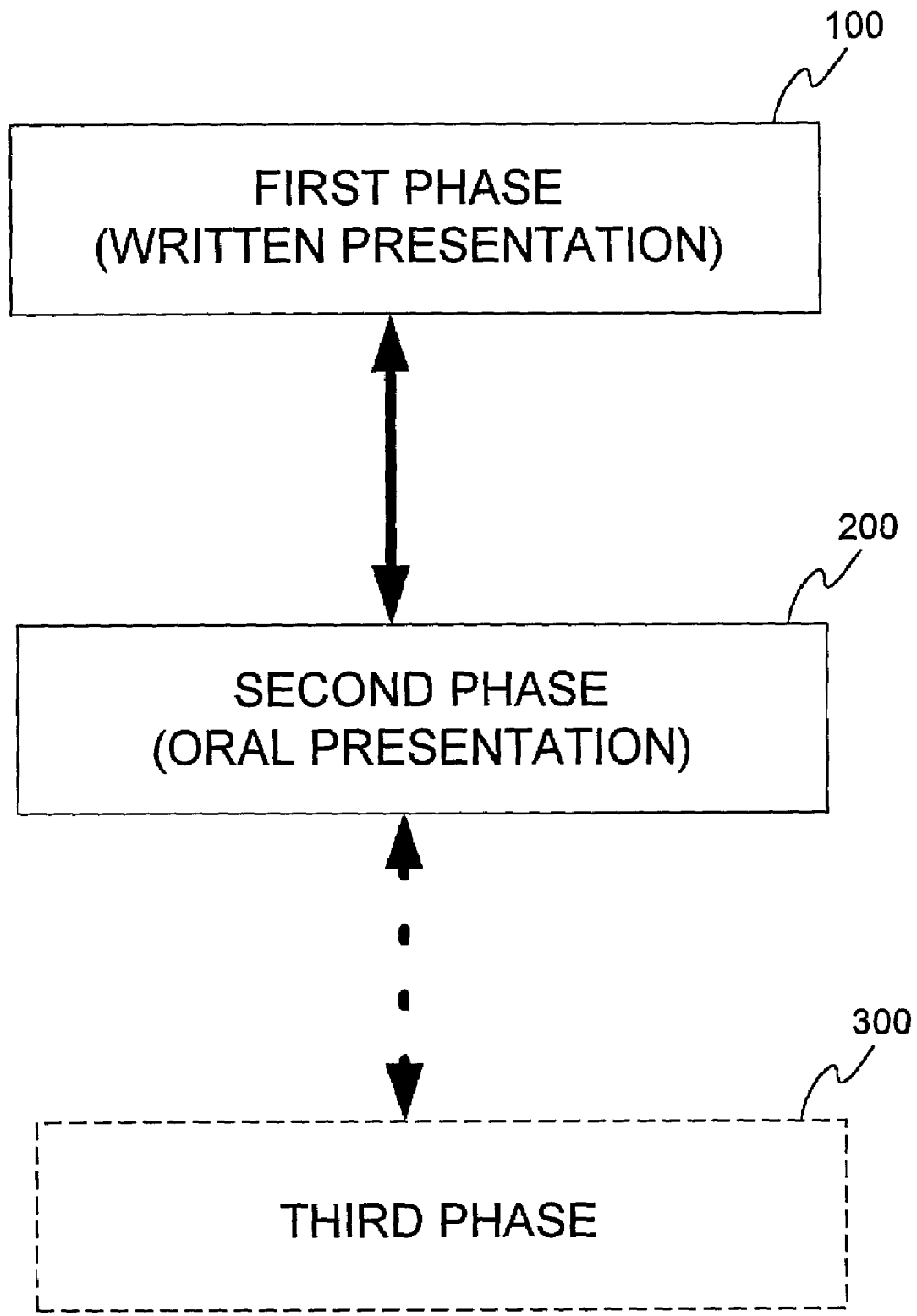
FIG. 1 is an exemplary block diagram of the present invention illustrating the first, second and optional at least third competition phases.
Figure 4:
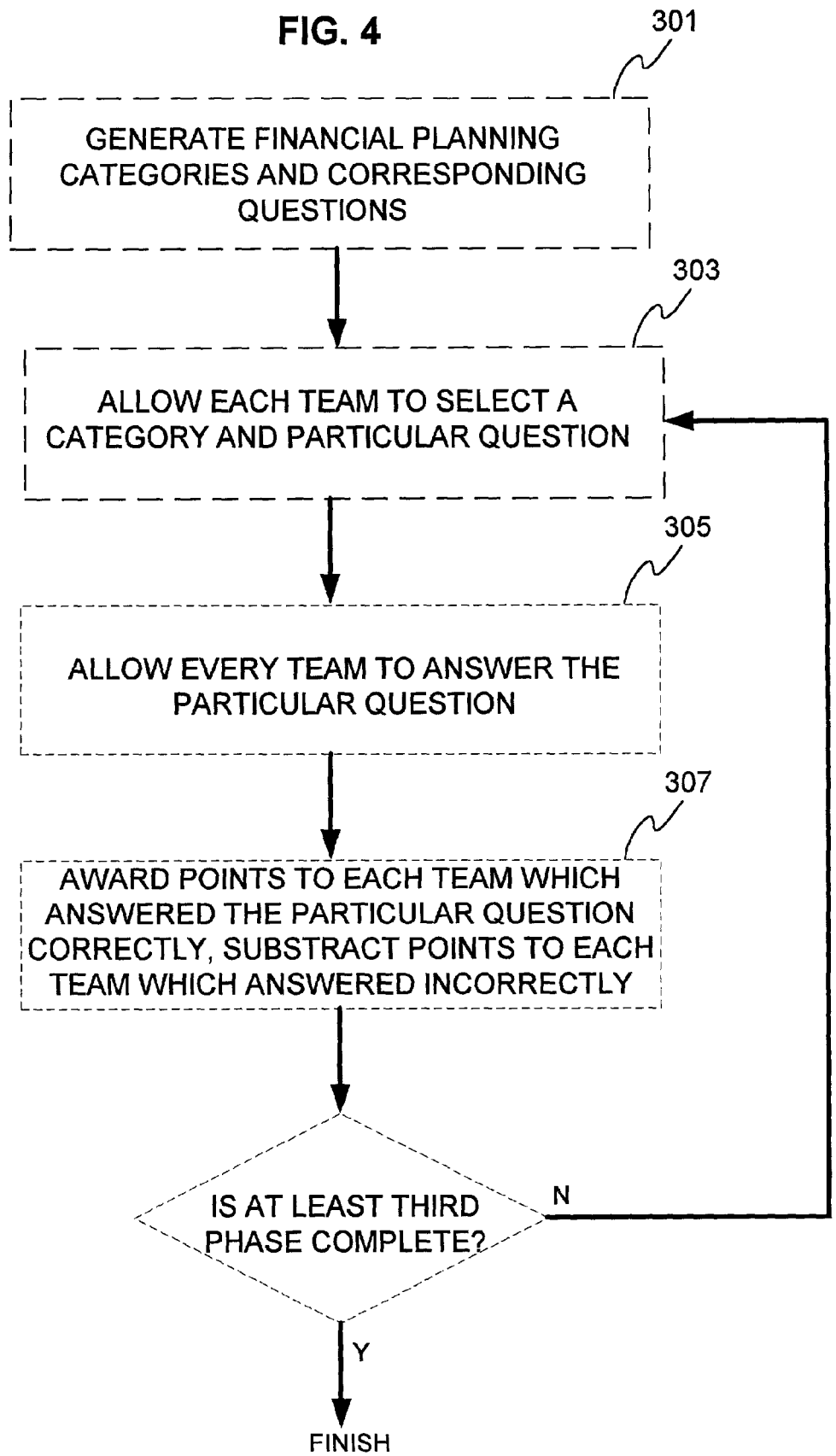
FIG. 4 is a block diagram of an exemplary at least third phase competition process of the present invention.

Optionally, as described above, a representative third phase 300 may include a gameshow-style type of competition having the following format (the optional feature of this phase being illustrated by dotted-line boxes in FIGS. 1 and 4). In one embodiment, each team from the second phase will participate in the third phase or only certain teams participate in the third phase. In the third phase 300, the financial planning organization generates a predetermined number of categories with corresponding questions (step 301). Thus, the organization may generate, for example, six categories of questions with each category having five questions. The questions preferably correspond to financial planning and will typically range from, for example, 100 to 500 points in value (with the more difficult questions having a higher point value). The questions may either be short answer or multiple choice.

Preferably, there may be more than one correct answer for the multiple choice questions. Each team will then take turns selecting questions, however, every team will answer each of the questions (step 303). For example, if team # 1 selects the question corresponding to 400 points, all teams will answer and be awarded (or subtracted) points appropriately (step 307). Then, team # 2 selects the question corresponding to 200 points, all teams will answer and awarded points appropriately (step 307). This process is repeated until all the questions in each category are answered by all the teams (step 309). If a team achieves a correct answer, the corresponding points are awarded to the team total (step 307). If the team gets an incorrect answer or does not answer, the corresponding points are subtracted from the team total (step 307). In one embodiment, the teams will have a limited amount of time to answer each question. If any team disagrees with the answer to a question, the team may appeal the answer to a third party appeals board, whose majority decision may be final. The questioning in this representative embodiment continues until all questions have been answered by the teams, or otherwise, until the third phase is complete (step 309).

The present invention provides several advantages for financial planning organizations or like companies. The increase in financial planning curriculums indicates that there are students who are interested in pursuing this unique field of opportunity. However, schools have only implemented financial planning programs during the past decade and most financial planning organizations do not recognize that there are numerous schools located throughout the United States and elsewhere that provide financial planning classes or degrees. Additionally, most organizations do not sufficiently recognize or measure the quality or quantity of advice provided in a financial plan. The present invention increases opportunities for recruiting qualified and interested individuals and further promotes a career in financial planning. Moreover, the present invention allows the financial planning community to acknowledge, support and build relationships with schools, educators, students, industry representatives and the media. Additionally, it will now be recognized that the present invention promotes camaraderie and helps develop team social skills amongst the participants in each team, with each person pursing the same objective of providing quality financial planning advice.

The present invention may be described herein in terms of functional block components and various processing steps. It should be appreciated that such functional blocks may optionally be realized by any number of hardware, firmware, and/or software components configured to perform any of the specified functions or steps. For example, the present invention may employ various computing systems, including memory elements, digital signal processing elements, look-up tables, databases, and the like, which may carry out a variety of functions under the control of one or more microprocessors or other control devices. Such general techniques and components that are known to those skilled in the art are not described in detail herein. It should further be understood that the exemplary process or processes illustrated may include more or less steps or may be performed in the context of a larger processing scheme. Furthermore, the various flowcharts presented in the drawing figures are not to be construed as limiting the order in which the individual process steps may be performed.

Further, any software or hardware optionally employed may communicate through any known network such as the Internet. For example, as seen generally in FIG. 5, the present invention allows a team to communicate to the financial planning organization by a first computing system 501 which is in communication with a second computing system 502 over a first network $N_x$ (such as, for example, a data network, a local area network (LAN), a wide area network (WAN), a global computer network such as the Internet or other network architectures). The network may include a host server including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, account data, card data, merchant data, financial institution data and/or like data that could be used in association with the present invention. Such communication may be implemented in any phase of the present invention. Thus, in one embodiment, the first computing system 501 is a personal computer, laptop computer or like primary personal computing means. Also, in one embodiment, the network $N_x$ is a network configured to transmit data or signals over the first network $N_x$ by conventional communication transmission means such as by wire, wireless, satellite, radio frequency, cable, DSL, fiber optic cables or any combination of these or other communication means. Those of skill in the art will realize that any data or signals traveling over the communication means are formed from any number of conventional techniques, including binary signals, analog signals, high-level software code or low-level software code, whether or not in encrypted format. The second computing system 502 is, in one embodiment, a computer server, computer mainframe or like secondary computing means optimally configured to store, process and transmit data over any of the networks $N_x$.

Without limitation, team members, and the financial planning organization may also be suitably coupled to a network via data links. A variety of conventional communications media and protocols may be used for data links, such as, for example, a connection to an Internet Service Provider (ISP) over the local loop as is typically used in connection with standard modem communication, cable modem, dish networks, ISDN, Digital Subscriber Line (DSL), or various wireless communication methods. A representative merchant system might also reside within a local area network (LAN) which interfaces to a network via a leased line (T1, D3, etc.). Such communication methods are well known in the art, and are covered in a variety of standard texts.

As will be appreciated by one of ordinary skill in the art, the present invention may be embodied as a method, a system such as a data processing system and/or a computer program, or variations thereof. Accordingly, the present invention may take the form of an entirely software embodiment, an entirely hardware embodiment, or an embodiment combining or implementing aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like. These computer program instructions may also be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Communication between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention. It is contemplated that the use of the present invention can involve components having different characteristics as long as the principle, the presentation of a method for a financial planning competition, is followed.

The invention claimed is:

1. A computer implemented method for a financial planning competition, the method comprising the steps of:
    during a first phase of competition, electronically generating, by a financial planning organization, a client profile, wherein the client profile includes at least one of: client name, marital status, date of birth, a social security number, state of residence, citizenship, health status, number of dependent children, employment, relationship information, background information, financial goal information, and asset information;
    electronically providing the client profile to a plurality of teams;
    electronically receiving a written financial plan which includes personal information relating to a client, a goal summary, an analysis of client financial planning subject area, and recommendations from each of said plurality of teams, wherein the financial plan achieves a predetermined client goal based upon the client profile;
    electronically reviewing, by a third party judge, each financial plan based on awareness of industry standards, use of industry standards, correct mathematical computations, correct law information, correct law tables, and regulatory guidelines followed and at least one of: personal assets, cash assets, fixed assets, equity assets, retirement assets, liabilities, life insurance policies, income, income taxes, retirement plan contributions, savings contributions, discretionary expenses and committed expenses predetermined financial electronically assigning award points to each plan based on awareness of industry standards, use of industry standards, correct mathematical computations, correct law information, correct law tables, and regulatory guidelines followed, and at least one of: personal assets, cash assets, fixed assets, equity assets, retirement assets, liabilities, life insurance policies, income, income taxes, retirement plan contributions, savings contributions, discretionary expenses, and committed expenses; and
    electronically selecting a subset of the plurality of teams to participate in a second phase of competition based on the award points.

2. The method of claim 1 further comprising the steps of:
    during the second phase of the competition, generating, by the financial planning organization, a revised client profile based on the client profile;
    providing the revised client profile to the subset of the plurality of teams;
    within a predetermined amount of time, receiving a revised financial plan from each of the subset of the plurality of teams, the revised financial plan configured to achieve at least one predetermined client goal based upon the revised client profile; and
    reviewing, by a third party judge, each revised financial plan based on predetermined financial planning criteria, wherein the third party judge assigns a second phase award points to each revised plan.

3. The method of claim 2, the client profile being based upon a fictitious client profile.

4. The method of claim 3, the written financial plan further including calculations based on a predetermined appearance and format, predetermined financial planning concepts and financial plan recommendations to achieve the at least one predetermined client goal.

5. The method of claim 4, the award points and the revised award points being assigned according to each plan's analysis of net worth information, total educational costs information, total qualified assets at retirement information, cash flow information, risk management information, investment planning information, income tax planning information, retirement planning information, education planning information and estate planning information.

6. The method of claim 2 further comprising the step of selecting, during a third phase of the competition, a predetermined number of the subset of the plurality of teams to participate in a third phase of competition based on the second phase award points to each revised plan.

7. The method of claim 6 further comprising the steps of allowing the financial planning organization to generate a predetermined number of categories having corresponding questions, allowing each of the predetermined number of the subset of the plurality of teams to select a question and allowing each of the predetermined number of the subset of the plurality of teams to answer the question, and awarding question points to each of the predetermined number of the subset of the plurality of teams having selected a correct answer, subtracting question points otherwise.

8. The method of claim 7, the questions corresponding to financial planning concepts.

9. The method of claim 8, further comprising the step of requiring each of the predetermined number of the subset of the plurality of teams to successively answer questions until one of the of the predetermined number of the subset of the plurality of teams is declared a winner by at least one reviewer.

10. A machine-readable medium having stored thereon a plurality of instructions, said plurality of instructions when executed by a processor, cause said processor to perform a computer implemented method for providing a financial planning competition
    having a first phase, the first phase comprising the step of establishing a first phase written competition by a financial planning organization, the first phase further comprising the steps of:
    allowing the financial planning organization to generate a first client profile wherein the client profile includes at least one of: a client name, marital status, date of birth, a social security number, state of residence, citizenship, health status, number of dependent children, employment, relationship information, background information, financial goal information, and asset information;

assigning the first client profile to a plurality of teams to prepare a written financial plan, which includes personal information relating to a client, a goal summary, an analysis of client financial planning subject area, and recommendations to achieve a predetermined client goal;

receiving the written financial plan from each of the plurality of teams by the financial planning organization receiving a review of the written financial plan from a third party judge, the written financial plan based on awareness of industry standards, use of industry standards, correct mathematical computations, correct law information, correct law tables, and regulatory guidelines followed and at least one of: personal assets, cash assets, fixed assets, equity assets, retirement assets, liabilities, life insurance policies, income, income taxes, retirement plan contributions, savings contributions, discretionary expenses, and committed expenses, wherein the third party judge assigns assigning award points based on awareness of industry standards, use of industry standards, correct mathematical computations, correct law information, correct law tables, and regulatory guidelines followed and at least one of: personal assets, cash assets, fixed assets, equity assets, retirement assets, liabilities, life insurance policies, income, income taxes, retirement plan contributions, savings contributions, discretionary expenses, and committed expenses the written financial plan and selecting at least one first phase competition winner based on the written award points.

11. The method of claim 10 further comprising the step of establishing a second phase oral competition by the financial planning organization, the second phase competition further comprising the steps of selecting a subset of the plurality of teams based on the written award points to participate in the second phase, introducing a second client profile to each of the subset of the plurality of teams and, within a predetermined amount of time, directing each of the subset of the plurality of teams to prepare a presentation corresponding to the second client profile to achieve at least one predetermined client goal, allowing each of the subset of the plurality of teams to communicate the presentation to the financial planning organization, judging each presentation based on predetermined financial planning criteria, assigning presentation award points, and selecting a second phase winner based on cumulative presentation award points.

12. The method of claim 11, the step of allowing each of the subset of the plurality of teams to communicate the presentation to the financial planning organization being executed over a computer network.

13. The method of claim 12, the computer network being the Internet.

14. The method of claim 11, the first and second client profiles being based upon a fictitious client fact pattern.

15. The method of claim 11, the first client profile being factually different than the second client profile.

16. The method of claim 15, the written financial plan further including calculations based on the first client profile, a predetermined appearance and format, predetermined financial planning concepts and financial plan recommendations to achieve the predetermined client goal.

17. The method of claim 16, further comprising the step of awarding each first phase winner a corresponding prize.

18. The method of claim 17, the corresponding prize being a scholarship.

19. The method of claim 18, the corresponding prize being a cash prize.

20. The method of claim 11, the step of allowing each of the subset of the plurality of teams to communicate the presentation to the financial planning organization being executed orally by at least one member from each of the subset of the plurality of teams.

21. The method of claim 11, the step of allowing each of the subset of the plurality of teams to communicate the presentation to the financial planning organization further including a discussion of calculations based on the first client profile, a predetermined appearance and format, predetermined financial planning concepts and financial plan recommendations to achieve the predetermined client goal.

22. The method of claim 21, further comprising the step of awarding each second phase winner a corresponding prize.

23. The method of claim 22, the corresponding prize being a scholarship.

24. The method of claim 23, the corresponding prize being a cash prize.

25. The method of claim 11 further comprising the step of establishing a third phase financial planning knowledge-based competition by a financial planning organization, the third phase competition further comprising the steps of generating a predetermined number of financial planning categories having corresponding questions, allowing one of the subset of the plurality of teams to select a particular question, having each of the subset of the plurality of teams answer the particular question, awarding third phase points to each of the subset of the plurality of teams having selected a correct answer to the particular question and subtracting third phase points otherwise, and allowing each of the subset of the plurality of teams to successively answer questions until one of the subset of the plurality of teams is declared a winner based on cumulative third phase points.

26. The method of claim 25, further comprising the step of awarding each third phase winner a corresponding prize.

27. The method of claim 26, the corresponding prize being a scholarship.

28. The method of claim 27, the corresponding prize being a cash prize.

29. The method of claim 1, further comprising:
generating a revised client profile based on the client profile, the revised client profile being factually different than the client profile;
providing the revised client profile to the subset of the plurality of teams;
receiving a revised financial plan from each of the subset of the plurality of teams, the revised financial plan configured to achieve the predetermined client goal based upon the revised client profile; and
reviewing, by a third party judge, each revised financial plan based on the predetermined financial planning criteria, wherein the third party judge assigns a second phase award points to each revised plan.

30. The method of claim 29 further comprising the step of hosting a third phase competition, the third phase competition further comprising the step of selecting a predetermined number of the subset of the plurality of teams to participate in a third phase of competition based on the second phase award points.

31. The method of claim 30 further comprising the steps of allowing the financial planning organization to generate a predetermined number of categories having corresponding questions, allowing each of the predetermined number of the subset of the plurality of teams to select a question and allowing each of the predetermined number of the subset of the plurality of teams to answer the question, and awarding question points to each of the predetermined number of the subset of the plurality of teams having selected a correct answer, subtracting question points otherwise.

32. The method of claim 31, the questions corresponding to financial planning concepts.

33. The method of claim 31, further comprising the step of requiring each of the predetermined number of the subset of the plurality of teams to successively answer questions until one of the predetermined number of the subset of the plurality of teams is declared a winner by at least one reviewer.

34. The method of claim 29, the written financial plan further including calculations based on the client profile, a predetermined appearance and format, predetermined financial planning concepts and financial plan recommendations to achieve the predetermined client goal.

35. The method of claim 29, the award points and the revised award points being assigned according to each plan's analysis of net worth information, total educational costs information, total qualified assets at retirement information, cash flow information, risk management information, investment planning information, income tax planning information, retirement planning information, education planning information and estate planning information.

* * * * *